United States Patent [19]
Ackerman

[11] 3,744,729
[45] July 10, 1973

[54] FOOD GRINDER

[76] Inventor: Frank M. Ackerman, Route 2, Box 1760, Auburndale, Fla.

[22] Filed: Apr. 7, 1971

[21] Appl. No.: 131,915

[52] U.S. Cl. ............................. 241/239, 241/242
[51] Int. Cl. ........................................... B02l 4/10
[58] Field of Search ...................... 146/182, 177; 241/239, 241, 242

[56] References Cited
UNITED STATES PATENTS

| | | | |
|---|---|---|---|
| 328,996 | 10/1885 | Anthoine | 241/239 X |
| 2,981,487 | 4/1961 | Davis | 241/239 X |
| 1,509,730 | 9/1924 | Hughes | 241/239 X |
| 3,482,790 | 12/1969 | Boster | 241/239 X |
| 220,698 | 10/1879 | Brown | 241/241 X |

FOREIGN PATENTS OR APPLICATIONS

| | | | |
|---|---|---|---|
| 26,347 | 6/1907 | Sweden | 241/239 |

*Primary Examiner*—Gil Weidenfeld
*Attorney*—Stefan M. Stein

[57] ABSTRACT

A grinding device for grinding or cutting food of various varieties comprising a support frame member which is formed to mount on a detachable collector or receptacle. A cutting assembly is detachably mounted to the support frame member and includes a rotatable cylindrical cutting element and an adjustable cutting element which co-act to cut or grind food to a selected size. The cylindrical cutting element includes an elongated shaft for mounting of a detachable crank handle which when rotated imparts a rotational movement to the cylindrical cutting element thereby creating the grinding action. A removable hopper for introducing the food to the cutting assembly is secured on top of the support frame and over the cutting assembly by a locking device. An indicator cooperates with the adjustable cutting element to indicate the desired size of cut.

6 Claims, 5 Drawing Figures

INVENTOR.
FRANK M. ACKERMAN
BY Law Offices of
Stefan M. Stein
ATTORNEY.

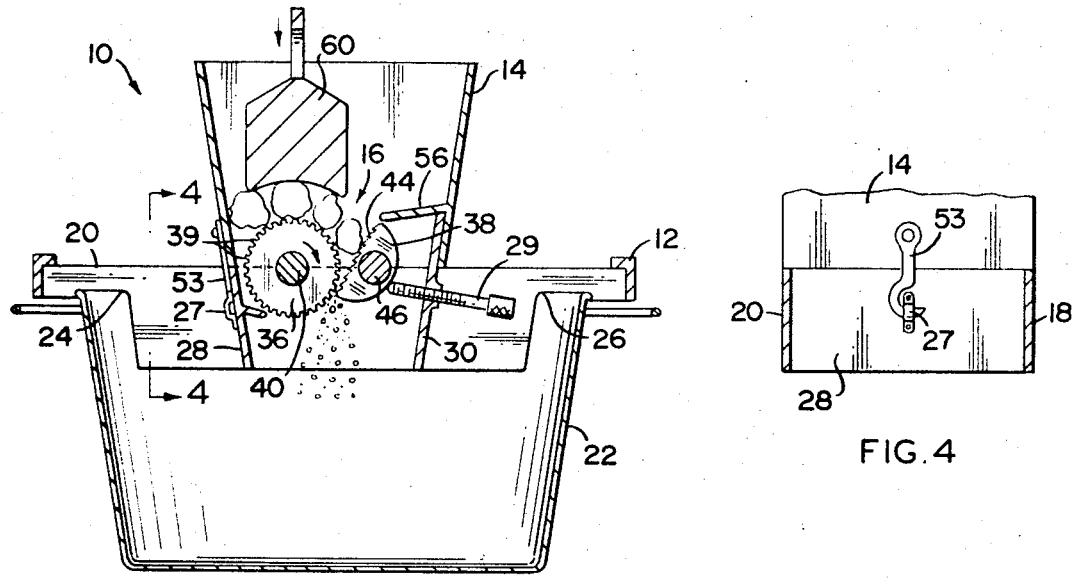
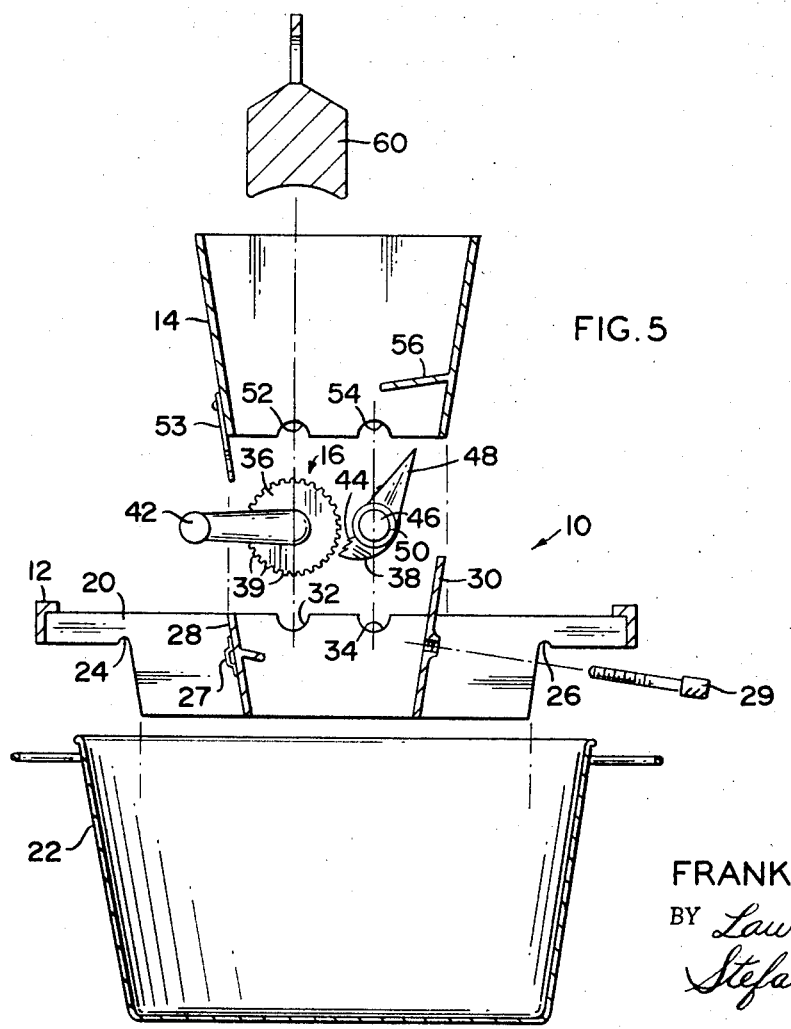

FOOD GRINDER

BACKGROUND OF THE INVENTION

1. Field of the Invention

This invention relates to a manually operated food grinder which may be disassembled and is designed to grind food to a selected size through the use of a crank handle which when rotated imparts a cutting or grinding action to a cutting assembly including a first rotational cutting element and a second adjustable cutting element.

2. Description of the Prior Art

Currently there is a wide variety of food grinders disclosing numerous features. These features include adjusting means for selecting the cut size. In addition a number of the conventional designs provide for partial disassembly of the devices to facilitate cleaning and storage.

Since the user of a food grinder will have an occasion to prepare different foods for various occasions, it is desirable that any food grinder have an adjustable cutting means to permit variations in the size and cute of the food as required. Unfortunately, when the means for adjusting cut sizes is introduced in the prior art the structure becomes generally more complex thereby increasing the cost of production and, in many cases, inhibits the user's ability to clean the grinder after finishing the process.

The inventor's device overcomes these problems by providing a food grinder of simple design with a minimum number of working parts. As a result the device may be both assembled and disassembled completely with relative ease thus facilitating a complete and thorough cleaning as well as providing convenience of storage.

SUMMARY OF THE INVENTION

This invention relates to a food grinder of simple, durable construction, which overcomes problems generally associated with prior art food grinders and which are designed to be used primarily in the home. More specifically, the food grinder is so constructed that it can be fully disassembled for cleaning and storage. The grinder comprises a support frame member suitable for mounting on a receptacle or collector, an adjustable cutting assembly, and a hopper to direct the uncut food to the cutting assembly.

The frame comprises an open enlongated form channeled on the underside to seat securely upon a detachable food receptacle. Mounted across the width of the frame are two back plates between which a cutting assembly is located. Two sets of grooves are cut in the upper portion of the frame to form bearing mounts to seat the elements of the cutting assembly securely therein.

The cutting assembly comprises a first cutting element comprising a cylindrical cutting gear having spiral vanes and an elongated extension on which a manual crank handle is mounted. The assembly includes a second cutting element having an adjustable cutting surface. This element may be pivoted about its longitudinal axis which serves to adjust the relative positions of first and second cutting element. An indicator is mounted in cooperation with the second element and serves to indicate, upon rotation of the second element, the size of cut for which the device is set.

The hopper comprises a slightly tapered hollow bin having a lower end generally smaller than the upper end. The lower portion of the hopper has two sets of grooves corresponding to those cut in the support frame which fit tightly against shaft extensions of the cutting elements. Mounted internally in the hopper is a plate provided to channel the food product to be cut directly to the cutting assembly. Mounted on one end of the hopper is a means of locking the hopper to the support frame. Various indicia may be placed on the hopper in cooperation with the indicator means to indicate the cutting size selected. A manually operated pusher is provides to force the food product down into the hopper and into engagement with the cutting assembly. This provides a more rapid and efficient cutting process.

In operation, the device is first adjusted for selection of the desired cutting size. With the support frame and entire assembly mounted on the food receptacle, the uncut food is placed in the hopper. While depressing the food in the hopper against the cutting assembly with the weighted pusher, the operator rotates the crank handle connected to the cutting assembly in the desired direction. As the food is caught by the cutting gear and forced against the second cutting surface, it is cut or ground and forced through the space between the two cutting elements down into the receptacle or collector. This process may be repeated until an ample amount of ground food is accumulated. It is then a simple matter to remove the support frame with cutting assembly and hopper, leaving the cuttings in the receptacle to be used as desired.

A significant features of this device is the ease and extent of disassembly after the use as described. Having used the grinder, the operator may remove the hopper and both cutting elements from the support frame. This complete disassembly permits ready access to all parts thereby allowing complete and thorough cleaning possible.

It can therefore be seen that a number of the problems prevelant in conventional type food grinders are solved utilizing the present invention.

The present invention accordingly comprises the features of construction, combination of elements and arrangement of parts which will be exemplified in the construction hereinafter set forth and the scope of the invention will be indicated in the claims.

BRIEF DESCRITION OF THE DRAWINGS

For a fuller understanding of the nature and object of the invention, reference should be had to the following detailed description taken in connection with the accompanying drawings in which:

FIG. 3 is a sectional view of the food grinder assembly taken along lines 3—3 of FIG. 1 showing the cooperation of the pusher and the cutting assembly.

FIG. 4 is a view taken along line 4—4 of FIG. 3 showing the locking means between the hopper and support member.

FIG. 5 is an exploded front view showing the various structural elements of the food grinder.

Similar reference characters refer to similar parts throughout the several views of the drawings.

DETAILED DESCRIPTION

Figure 1:
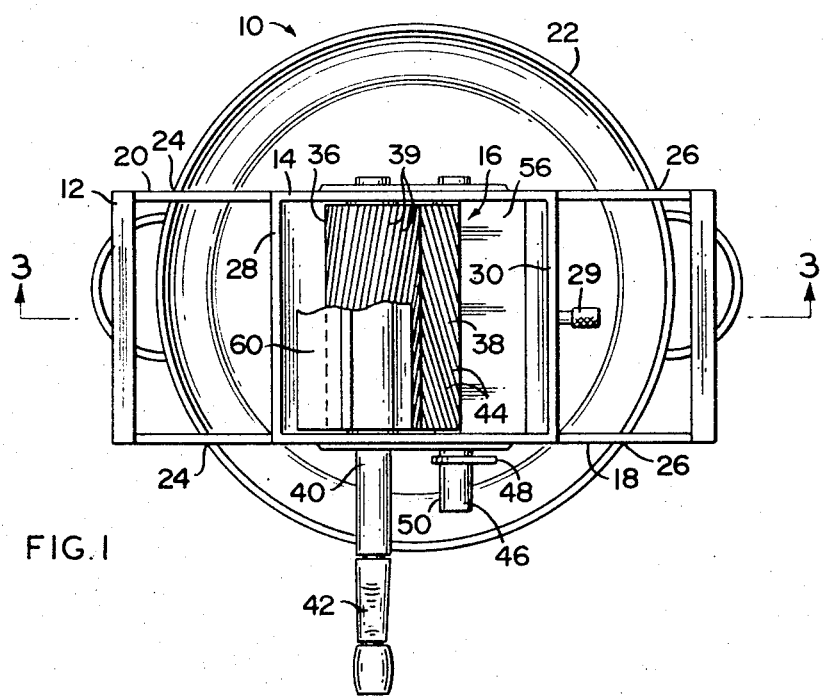
FIG. 1 is a top partial cutaway view of the food grinder assembly of the present invention.
Figure 2:
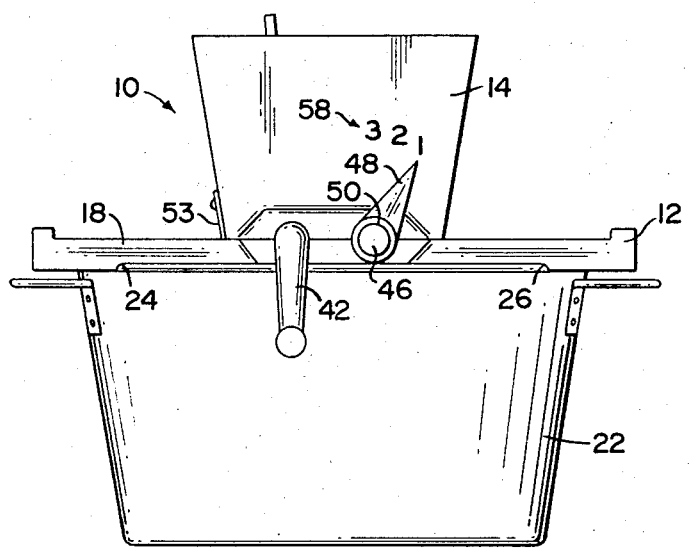
FIG. 2 is a front view of the food grinder mounted on a conventional receptacle.

As shown in FIG. 1, this invention relates to a food grinder generally indicated at 10 and including a support frame member 12, a food hopper 14 and a cutting assembly 16. Support frame member 12 comprises an open elongated structure with sides 18 and 20 designed to be removably connected to a suitable collector or receptacle 22. The underside of frame 12 is channeled as 24 and 26 to seat securely on receptacle 22 when in use. As best shown in FIG. 5, two backplates 28 and 30 are vertically mounted across the width of the support frame member 12 and serve as a means of at least partially housing the cutting assembly 16. Two sets of grooves 32 and 34 are formed in the upper side of frame 12 to form bearing mounts on which the cutting assembly 16 is mounted.

The cutting assembly 16 comprises a first cutting element 36 and a second cutting element 38. The first cutting element 36 includes a cylindrical cutting gear having spiral vanes defining cutting edges 39. The vanes are mounted about an elongated shaft 40 serving as a means of securing cutting element 36 on frame 12. Shaft 40 further serves as a means for mounting a crank handle 42 detachably fixed on its forward extension. The second cutting element 38 includes a cutting surface having diagonial vanes 44. Shaft 46 is connected to element 38 and supports it in bearing mounts 34 on frame 12. In addition, indicator 48 is mounted on the outer portion 50 of shaft 46 and acts as a means for indicating the angular orientation of cutting element 38 relative to the surface of cutting 36.

The food hopper 14 comprises a slightly tapered hollow bin, the lower end of which is smaller than the upper end. Two sets of grooves 52 and 54 are cut across the width of the hopper 14 on its lower portion. These grooves 52 and 54 correspond to grooves 32 and 34 and when operatively positioned will fit securely around shaft extensions 40 and 46 of cutting elements 36, 38 respectively. Mounted internally in the hopper 14 is a flange 56 provided to channel the food product directly into the cutting assembly 16. Indicia 58 which cooperates with the indicator 48 to indicate the cutting size selected may be arranged on one face of the hopper 14.

To provide a more rapid and efficient grinding process, a pusher 60 is manually operated as a means of forcing the food product into the hopper 14 and against the cutting gear assembly 16.

A retaining screw 29 is mounted within backplate 30 and serves as a means of holding the second cutting element 38 in a pre-selected position. As shown in FIG. 4, an eye 27 is mounted on backplate 28 which cooperates with a hook 53 mounted on the hopper 14. This provides a means of securely fastening the food hopper 14 to the frame 12 when fully assembled.

In operation the user simply places the receptacle or collector 22 on a suitable working surface. The support frame member 12 is then placed on the collector. The first cutting lement 36, having the detachable crank handle 42 properly mounted thereon, and the second cutting element 38 are placed in grooves 32 and 34 respectively. With the cutting assembly 16 in place, the food hopper 14 is mounted onto the frame support member 12 and over the cutting assembly 16. Hook 53 is rotated to latch with eye 27 on backplate 28. Once assembled the rotating screw 29 is loosened thus permitting the manual rotation of the second cutting element 38 by use of the adjustment knob 50. The second cutting element 38 is rotated or pivoted until the indicator 48 is aligned with the indicia 58 on the hopper 14 which corresponds to the cut size desired. Once the cut size desired is selected, the retaining screw 29 is tightened against the second cutting element 38. The user then inserts the food to be ground or cut into the top of the hopper 14. By use of the pusher 60 the operator forces the food product against the cutting assembly 16 and at the same time rotates the crank shaft handle 42 in a clockwise direction. This movement imparts the rotation to cutting element 36 which forces the food product against the second cutting element 38. As the rotation continues cutting elements 36 and 38 force the food down into the receptacle or collector thus providing the grinding action. This process is continued until the operator has desired quantity of ground food. To fully disassemble the device the user merely reverses the assembly procedure. Once disassembled it is an easy matter to clean and store.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described,
What is claimed is:

1. A portable food grinder configured for using in combination with a receiving collector, said grinder comprising: support means including an elongated open frame having channel means formed thereon to supportingly engage the upper periphery of the collector means, said support means further including skirt means extending downwardly therefrom to engage the inner wall of the collector to secure said support means to the collector, an adjustable cutting assembly comprising a first cutting element and a second cutting element, operating means operatively connected to said first cutting element, said first and second elements arranged in interengaging relation to each other such that rotational movement of said operating means imparts cutting action to said first and second element, upper and lower housing means arranged relative to each other to enclose said cutting assembly, said upper housing means comprising hopper means detachably mounted on said frame and said lower housing comprising a first and second spaced back plate extending across the width of said frame, latch means attached to said hopper means, said first back plate extending above said second back plate and said second back plate including eyelet means, such that said first back plate overlaps the side of said hopper means and said latch means engages said eyelet means to interlock said hopper means and said frame when said grinder is operatively assembled, opposite sides of said hopper means each including a pair of upper bearing mounts and corresponding sides of said frame each including a corresponding pair of lower bearing mounts said upper and lower bearing mounts cooperatively engaging said first and second cutting assembly to operatively secure said cutting assembly within said upper and lower housing means, adjusting means to adjust said cutting assembly, indicator means arranged in cooperative relation to both said cutting assembly and said adjusting means to indicate the size of the cut of food by adjustment of said cutting assembly.

2. A grinder as in claim 1 wherein said hopper means further includes a flange extending inwardly from the side wall thereof to engage said first backplate to secure said hopper means to said frame.

3. A grinder as in claim 1 wherein said first cutting element comprises a cylindrical shaped gear having spiral vanes defining cutting edges and further a shaft arranged in supporting relation to said bearing mounts and said second cutting element includes a shaft extension engaging said bearing mounts.

4. A grinder as in claim 1 wherein said operating means is a crank handle detachably mounted on said first cutting element.

5. A grinder as in claim 1 wherein said adjusting means comprises a retainer screw mounted on said support frame means in operative engagement with said second cutting element so as to regulate the angular orientation of said second cutting element relative to said first cutting element, whereby the distance between said first cutting element and said second cutting element may be selected.

6. A grinder as in claim 1 wherein said indicator means comprises an indicator member fixedly connected to said second cutting element so as to move therewith when said cutting element is oriented by said adjusting means, indicia placed on said grinder and arranged in cooperative relation to said indicator member, whereby the cutting size of said cutting assembly is indicated.

* * * * *